United States Patent [19]

Kawada et al.

[11] Patent Number: 4,631,807
[45] Date of Patent: Dec. 30, 1986

[54] METHOD OF MANUFACTURING A PERMANENT-MAGNET FIELD ROTOR

[75] Inventors: Shigeki Kawada; Yoichi Amemiya; Masatoyo Sogabe, all of Hachioji; Noboru Iwamatsu, Hino, all of Japan

[73] Assignee: Fanuc Ltd., Yamanashi, Japan

[21] Appl. No.: 708,210

[22] Filed: Feb. 11, 1985

[30] Foreign Application Priority Data

Jun. 10, 1983 [JP] Japan ................ 58-102833

[51] Int. Cl.[4] ........................................... H02K 15/02
[52] U.S. Cl. ........................................ 29/598; 29/418
[58] Field of Search ............... 29/598, 418; 310/156, 310/42

[56] References Cited

U.S. PATENT DOCUMENTS 3,979,821 9/1976 Noodleman ................ 29/598
4,327,302 4/1982 Hershberger ................ 310/156

Primary Examiner—Mark Rosenbaum
Assistant Examiner—P. W. Echols
Attorney, Agent, or Firm—Armstrong, Nikaido, Marmelstein & Kubovcik

[57] ABSTRACT

A permanent-magnet field rotor (10) includes a plurality of permanent magnets (18) disposed in a radial fashion, and yokes (19) disposed between each two successive permanent magnets (18) and made of a lot of sheet elements (20). The method of manufacturing the permanent-magnet field rotor comprises the step of stacking a lot of same shaped thin plate members (25) each having a plurality of sectoral york element portions (26) arranged in a radial fashion and link portions (27) each linking the outer circumferential edges of each two successive york element portions (26) to one another so as to define therebetween a permanent magnet receiving slot (29). In the state where permanent magnets (18) are inserted in the slots (29) of the stacked thin plate members (25), respectively, the stacked thin plate members (25) are firmly fixed to each other. Each of the link portions (27) of the stacked thin plate members (25) is cut out in the stacking direction by a range which is less than the width of each permanent magnet (18). From this, the yokes (19) made of sheet elements (20) are formed at the opposite sides of each permanent magnet (18) and separated from one another.

7 Claims, 7 Drawing Figures

METHOD OF MANUFACTURING A PERMANENT-MAGNET FIELD ROTOR

TECHNICAL FIELD

The present invention relates to a method of manufacturing a permanent-magnet field rotor, and more particularly, to a method of manufacturing a permanent-magnet field rotor including a plurality of permanent magnets arranged in a radial fashion and yokes disposed between each two successive permanent magnets and made of a number of stacked sheet elements.

BACKGROUND ART

A permanent-magnet field rotor is often used in synchronous motors or the like. Traditionally, the permanent-magnet field rotor includes a plurality of permanent magnets arranged in a radial fashion and yokes disposed between each two successive permanent magnets and made of a number of stacked sheet elements. Each of the permanent magnets has a generally rectangular cross-section which extends in the radial direction, and each magnet has circumferentially opposed side faces which are magnetized into opposing poles N and S, respectively. Each yoke has a generally sectoral cross-section and has circumferentially opposed side faces, each of which is in close contact with the same pole side face of each of the adjacent permanent magnets. The outer circumferential faces of the yokes provide alternately different poles. Each two successive yokes disposed at opposite sides of each of the permanent magnets are separated from each other to prevent the yokes from forming a magnetic short-circuit. Each yoke is provided at either corner between the circumferential face and the side faces thereof with protrusions each overlapping the outer side face of each of the adjacent permanent magnets, to prevent them from moving outwardly in the radial direction.

Each yoke is made as a one-piece solid body or as a stack of a number of sheet elements.

In the case of manufacturing the permanent-magnet field rotor including yokes each made of a number of stacked sheet elements, the yokes were heretofore formed by stacking the sheet elements, each of which was formed by press punching, and having a generally sectoral shape as a final shape. The yokes and the permanent magnets were then firmly secured to each other in such a manner that the permanent magnets were disposed between each two successive yokes.

In this case, however, since it was necessary to form a plurality of stacks of sectoral sheet elements in accordance with the number of yokes, a long operating time for forming the plurality of stacks was required. Furthermore, the sectoral sheet elements in each of the stacks were apt to slip and move apart from each other, and thus it occurred that they became oriented in different directions. Consequently, the insertion of the permanent magnets into the space between each two successive stacks or yokes was difficult and troublesome. Therefore, it was difficult to improve the productivity of the permanent-magnet field rotor in the conventional method of manufacturing the same.

In order to facilitate the insertion of the permanent magnets between each two successive yokes, a cylindrical jig surrounding the stacks has been used to limit the position of the sectoral sheet elements. In this case, although the regulation of orientation of the sheet elements was improved along the stacking direction, the operation for stacking the sectoral sheet elements within a narrow space inside the cylindrical jig became more difficult. Therefore, it was also difficult to improve the productivity of the permanent-magnet field rotor.

SUMMARY OF THE INVENTION

A main object of the present invention is to provide a method of manufacturing a permanent-magnet field rotor in which the above-mentioned drawbacks are eliminated.

More particularly, an object of the present invention is to provide a method of manufacturing a permanent-magnet field rotor which can improve the productivity of the permanent-magnet field rotor including a plurality of permanent magnets arranged in a radial fashion, and yokes disposed between each two successive permanent magnets and made of a number of sheet elements.

Another object of the present invention is to provide a method of manufacturing a permanent-magnet field rotor which can efficiently produce a permanent-magnet field rotor including yokes made of a number of stacked sheet elements without using a specific jig as described above.

According to the present invention, there is provided a method of manufacturing a permanent-magnet field rotor including a plurality of permanent magnets disposed in a radial fashion, and yokes disposed between each two successive permanent magnets and made of many sheet elements, comprising the steps of:

stacking a number of thin plate members having the same shape, each having a plurality of sectoral yoke element portions arranged in a radial fashion and link portions each linking the outer circumferential edges of each two successive yoke element portions to one another so as to define therebetween a permanent magnet receiving slot;

in the state where the permanent magnets are inserted in the slots of the stacked thin plate members firmly fixing the stacked thin plate members to each other; and cutting out each of the link portions of the stacked thin plate members in the stacking direction by a range which is less than the width of each of the permanent magnets, thereby forming at opposite sides of the permanent magnets yokes which are separated from one another and made of sheet elements.

Preferably, the thin plate members are efficiently formed by press punching an electromagnetic steel sheet.

Preferably, the stacked thin plate members are firmly tightened and fixed by a pair of end plates disposed at opposite ends of the stacked thin plate members, respectively, and rods are connected at the opposite ends thereof to the end plates, respectively.

Preferably, each of the yoke elements of the stacked thin plate members has a hole, and each of the rods extends through that hole of each of the yoke elements and is connected to the end plates. Therefore, after the link portions of each of the thin plate members are partially cut out, each of the separated yoke elements is held by the corresponding rod.

The above-described and other objects and features of the present invention will become apparent from the following detailed description with reference to the attached drawings.

BEST MODE OF CARRYING OUT THE INVENTION

Figure 1:
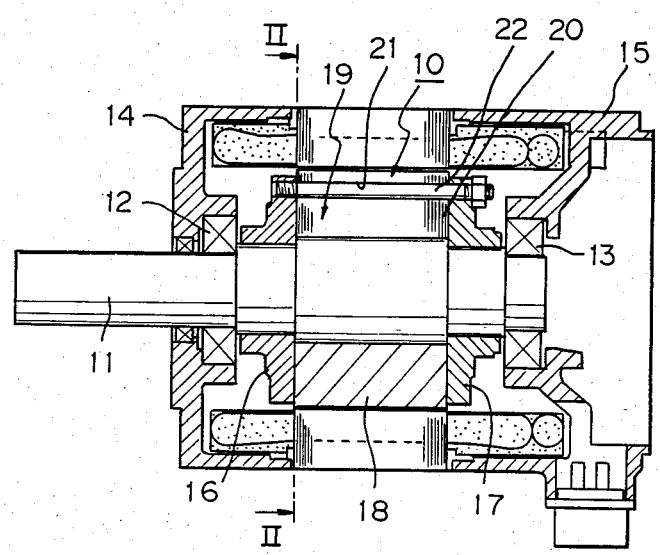
FIG. 1 is a longitudinal sectional view schematically illustrating a general structure of the synchronous motor including a permanent-magnet field rotor.
Figure 2:
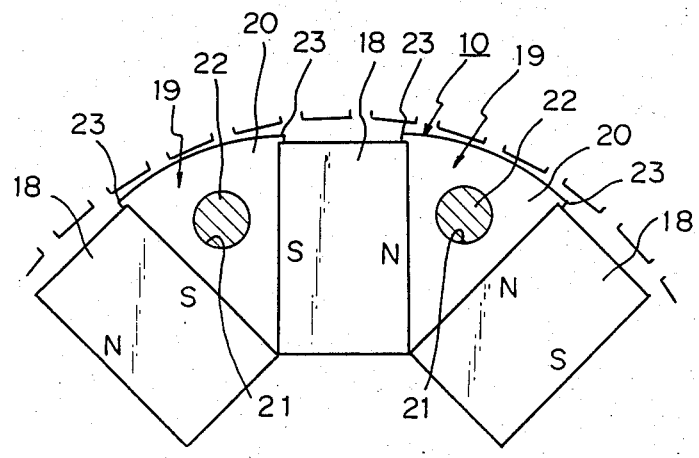
FIG. 2 is a sectional view taken along the line II—II of FIG. 1 illustrating the constitution of the permanent-magnet field rotor of the motor shown in FIG. 1.

Referring to FIGS. 1 and 2, which show a typical construction of the synchronous motor including a permanent-magnet field rotor, the permanent-magnet field rotor 10 comprises a shaft 11. The shaft 11 is rotatably supported in brackets or end bells 14 and 15 of a stator by a pair of bearings 12 and 13. A pair of axially spaced end plates 16 and 17 are fixed to the shaft 11. The end plates 16 and 17 are provided therebetween with a plurality of permanent magnets 18 which extend axially and outwardly in the radial direction, respectively. Each two successive permanent magnets 18 are provided therebetween with a yoke 19 which extends axially between the end plates 16 and 17. Each yoke is made of a number of sheet elements 20 stacked axially. Each sheet element 20 has a hole 21 which extends axially therethrough. A plurality of rods or bolts 22 extend through the holes 21 of the sheet elements 20, respectively. The opposite ends of each of the rod means 22 are firmly connected to the end plates 16 and 17, respectively. Accordingly, the permanent magnets 18 and yokes 19 are firmly secured by the rods 22 and the end plates 16 and 17 fixed to the shaft 11.

Each sheet element 20 of each yoke 19 is formed of a generally sectoral shape. Each sheet element 20 is provided at its opposite outer circumferential edge portions with protrusions 23, respectively. Each of the protrusions 23 overlaps the outer side face of each of the adjacent permanent magnets 18 to prevent the magnets 18 from moving outwardly in the radial direction.

Figure 3:
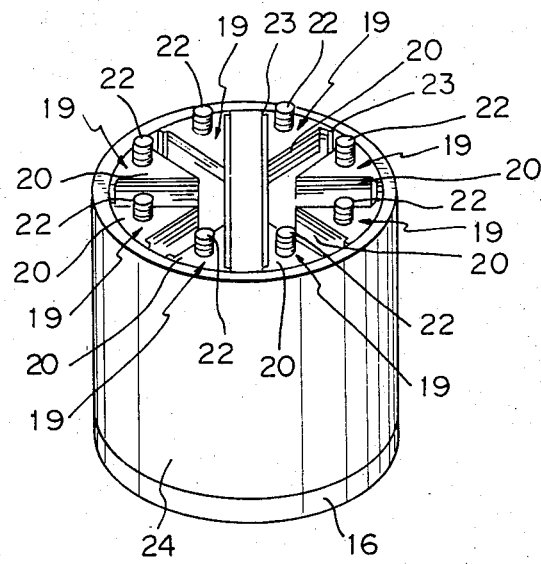
FIG. 3 is a perspective view illustrating a conventional metod of manufacturing the permanent-magnet field rotor.

In the conventional method for manufacturing the permanent-magnet field rotor having the above-mentioned structure, a number of sheet elements 20 each having the hole 21 and the projections 23 are previously made by press punching thin plate material, as shown in FIG. 3. The lower end of each rod 22 is connected to one of the end plates (16). The sheet elements 20 are stacked on the end plate 16 in such a manner that the rods 22 are inserted into the holes 21 of the sheet elements 20, respectively, thereby forming the yokes 19 made of a number of sheet elements 20 stacked along the rods 22, respectively. The permanent magnets (not shown) are inserted between each two successive yokes 19. Another end plate is then connected to the upper end of each rod 22, and the yokes 19 are tightened by the end plates. If a cylindrical jig 24 is used when the sheet elements 20 are stacked, the stacked sheet elements 20 can be regularly oriented. However, it is difficult to stack the sheet elements 20 within the cylindrical jig 24.

Next, the method according to the present invention for manufacturing the permanent-magnet field rotor having the construction shown in FIGS. 1 and 2 are described hereinafter with reference to FIGS. 4 through 7.

Figure 4:
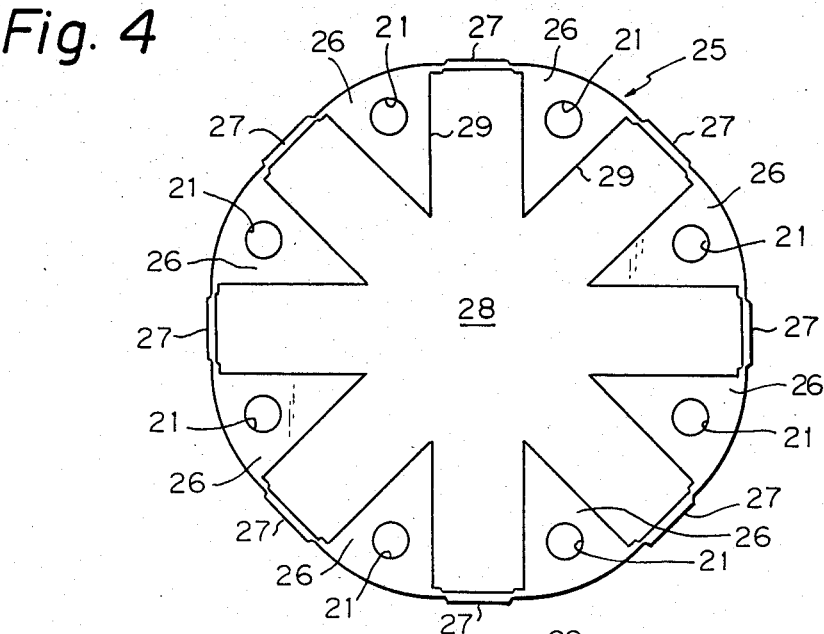
FIG. 4 is an end view of the thin plate member used for the method of manufacturing the permanent-magnet field rotor according to the present invention.

In the method according to the present invention for manufacturing the permanent-magnet field rotor, a number of generally circular thin plate members 25 are previously made by press punching the electromagnetic steel sheet as shown in FIG. 4. Each thin plate member 25 has a plurality of generally sectoral yoke element portions 26 disposed in the radial fashion, and link portions 27 each linking the outer circumferential edge portions of each two successive yoke elements 26. The yoke elements 26 define at the central portion of each thin plate member 25 a central aperture 28 for fitting thereinto the shaft 11. Each two successive yoke element portions 26 and each link portion 27 define a permanent magnet receiving slot 29 for fitting thereinto the permanent magnet. Each slot 29 extends outwardly in the radial direction from the central aperture 28. A hole 21 is formed in each yoke element 26.

Figure 5:
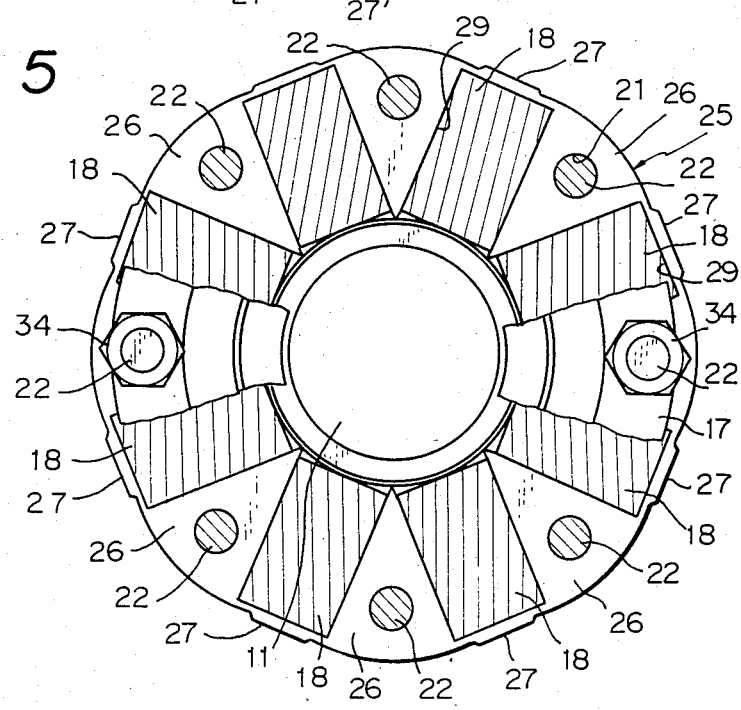
FIG. 5 is an end view partially in section illustrating the assembly in which permanent magnets and a number of stacked thin plate members are firmly fixed to each other according to the present invention.
Figure 6:
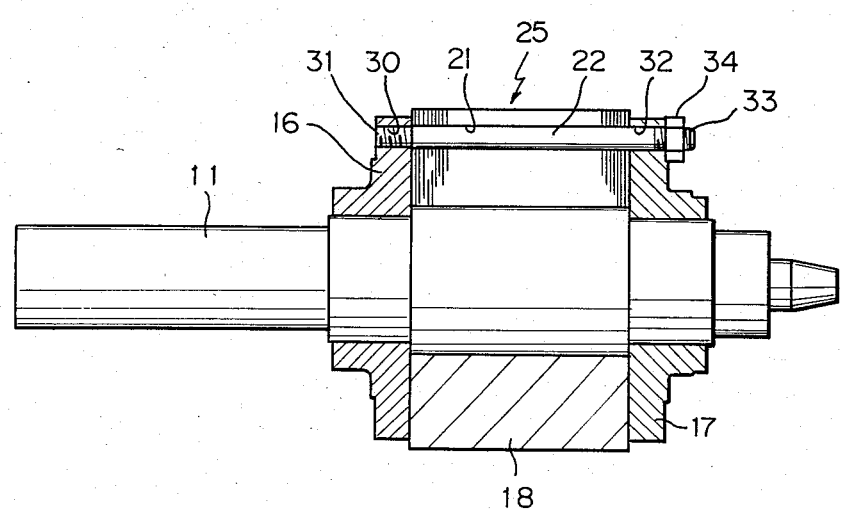
FIG. 6 is a longitudinal sectional view of the assembly shown in FIG. 4.

Referring to FIGS. 5 and 6, one of the end plates 16 and 17, for example, the end plate 16, is fixed to the shaft 11 by force fitting or the like. One end of each rod or bolt 22 is connected to the end plate 16. In this embodiment, screw holes 30 are formed in the end plate 16, and each rod 22 has at one end thereof a threaded portion 31 which is screwed into each screw hole 30. A number of thin plate members 25 are then stacked on the end plate 16 in such a manner that the rods 22 are inserted into the holes 21 of the yoke element portions 26, respectively. Since the thin plate members 25 are held by the plurality of rods 22, no slippage occurs among them.

The permanent magnets 18 are then inserted into the slots 29 of the thin plate members 25, respectively. Each permanent magnet 18 has a rectangular cross-section. Since no slippage occurs among the thin plate members 25, the inserting operation of the permanent magnets 18 can be effected very easily.

Another end plate 17 is then force fitted onto the shaft 11 and connected to the other end of each rod 22. In this embodiment, holes 32 are formed in the end plate 17, and each rod 22 has at the other end thereof a threaded portion 33 which extends through each hole 32 of the end plate 17. Nuts 34 are tightly screwed onto the threaded portions 33 of the rods 22, respectively, whereby the end plate 17 is firmly connected to the rods 22. At the same time, the stacked thin plate members 25 and permanent magnets 18 are firmly secured between the end plates 16 and 17 by the nuts 34, and thus an assembly is formed.

Figure 7:
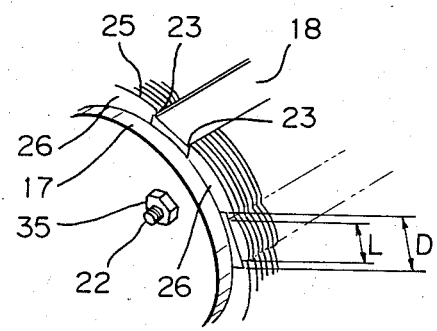
FIG. 7 is an elevational view of a part of the assembly illustrating the final process of the method according to the present invention.

As shown in FIG. 7, each link portion 27 of the thin plate members 25 is then cut out in the stacking direction thereof by a range L which is less than the width D of the permanent magnet 18. From this, the yoke element portions 26 located on opposite side faces of each permanent magnet 18 are separated from one another, and protrusions 23 each overlapping the outer side face of each permanent magnet 18 are formed on either outer circumferential edge portions of each yoke element portion 26. Thus each sheet element 20 of the yoke 19 shown in FIGS. 1 and 2 is formed.

In this embodiment, the stacked thin plate members 25 are firmly fixed to each other on the shaft 11. Consequently, when parts of the link portions 27 of the thin plate members 25 are cut out by a cutting operation or the like, the shaft 11 can be clamped by the cutting machine or the like. As shown in FIGS. 6 and 7, the outside dimensions of end plates 16 and 17 are smaller than the inside dimension of the link portions 27 of the thin plate members 25. Therefore, the cutting operation of the link portions 27 is easily effected.

Although the foregoing explanation has been made in reference to one embodiment of the present invention, the present invention is not limited to the above-mentioned embodiment. For example, the number of permanent magnets and yokes is not limited to that of the illustrated embodiment. The shaft may be force fitted to the end plates after the stacked thin plates are firmly fixed to each other by the rods and a pair of end plates. The rods may be rigidly connected to the end plates by welding.

CAPABILITY OF EXPLOITATION IN INDUSTRY

The method according to the present invention can be effectively applied for manufacturing the permanent-magnet field rotor used in the synchronous motor and can improve the productivity thereof.

We claim:

1. The method of manufacturing a permanent-magnet field rotor including a plurality of permanent magnets disposed in a radial fashion around said rotor, and yoke elements disposed between each two successive permanent magnets, comprising the steps of:
    forming a number of same shaped thin plate members from sheet magnetic material, each plate member having a plurality of sectoral yoke element portions arranged in a radial fashion and peripheral link portions each linking outer circumferential edges of each two successive yoke element portions to one another so as to define therebetween a permanent magnet receiving slot area;
    stacking a number of said plate members with said sectoral yoke element portions in alignment so that said slot areas form permanent magnet receiving slots therebetween;
    inserting permanent magnets in said permanent magnet receiving slots;
    fixing said stacked thin plate members firmly to each other by means of a pair of end plates disposed on opposite ends of said stacked thin plate members and rod means extending between and connected at opposite ends thereof to said end plates, respectively, said end plates being formed to have an outside dimension smaller than an inside dimension of said peripheral link portions; and
    cutting out, in the stacked direction, a central portion amount of each of said peripheral link portions of said stacked thin plate members outside the dimension of said end plates, said cut out amount being less than the width of each of asid permanent magnets, the remaining portions of said link portions thereby forming portions of said yokes at opposite sides of each of said permanent magnets for retaining said magnets, said yokes thereby being composed of stacks of said sheet magnetic material separated from one another.

2. The method according to claim 1, wherein said thin plate members are formed by press punching a magnetic steel sheet.

3. The method according to claim 1, wherein each of said yoke element portions of said stacked thin plate members has a hole, each of said rod means extending through a respective hole of each of said yoke element portions and being connected to said end plates, respectively.

4. The method of manufacturing a permanent-magnet field rotor including a shaft, a pair of axially spaced end plates fixed to said shaft, a plurality of permanent magnets extending axially between said end plates and extending outwardly in the radial direction, yokes disposed between each two sucessive permanent magnets, and a plurality of rod means extending between and connecting said end plates, said method comprising the steps of:
    forming a number of same shaped thin plate members from sheet magnetic material, each plate member having a plurality of generally sectoral shaped yoke element portions disposed in radial fashion, and peripheral link portions each linking outer circumferential edge portions of each two successive yoke element portions so as to define therebetween a permanent magnet receiving slot area, each sectoral yoke element portion having a hole formed there through;
    stacking a number of said thin plate members in alignment with each other so that said slot areas form permanent magnet receiving slots therebetween;
    inserting permanent magnets in each of said permanent magnet receiving slots;
    fixing said stacked thin plate members firmly to each other by means of said end plates being positioned at opposite ends of said stacked members and said rod means each extending through respective holes formed through said yoke element portions and connected at each end to a respective one of said end plates, said end plates having a maximum dimension smaller than an inner peripheral dimenions of said peripheral link portions; and
    cutting out in the axial direction a central portion of each of said peripheral link portions of said stacked thin plate members outside said diameter of said end plates, which portion is less than the width of each of said permanent magnets, the remaining portions of said link portions thereby forming portions of said yokes on opposite sides of each of said permanent magnets for retaining said magnets, said yokes being composed of stacks of said sheet magnetic material seperated from each other.

5. The method according to claim 4, wherein each of said thin plate members is formed by press punching a magnetic steel sheet.

6. The method according to claim 4, wherein said step of stacking said thin plate members includes inserting said rod means connected to one of said end plates fixed to said shaft into respective holes of said yoke element portions of each of said thin plate members.

7. The method according to claim 6, wherein said step of fixing firmly said stacked thin plate members to each other includes fixing the other plate member firmly to the other end of each of said rod means.

* * * * *